United States Patent Office 3,268,560
Patented August 23, 1966

3,268,560
METHOD FOR PREPARING A SODIUM DECA-
BORANE TETRAHYDROFURAN ADDUCT
Theodore L. Heying, Tonawanda, N.Y., assignor to Olin
Mathieson Chemical Corporation, a corporation of
Virginia
No Drawing. Filed Jan. 13, 1959, Ser. No. 786,653
1 Claim. (Cl. 260—346.1)

This invention relates to the preparation of the new adduct sodium decaborane tetrahydrofuran, $$NaB_{10}H_{13} \cdot C_4H_8O$$

More in particular, this invention relates to the preparation of sodium decaborane tetrahydrofuran by the reaction of sodium metal with decaborane while the decaborane is dissolved in tetrahydrofuran. The reaction is generally conducted at a temperature of from 40° to 100° C.

The product of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. The sodium decaborane adduct, when incorporated with oxidizers, is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates the invention.

Example 1

0.4 gram of sodium metal was added to a concentrated solution of 2 grams of decaborane in 15 ml. of tetrahydrofuran. An immediate reaction occurred with vigorous $H_2$ evolution. A deep orange color formed at the sodium tetrahydrofuran interface but rapidly dissipated into the yellow solution. The mixture was refluxed at 70° C. for 3 hours and upon cooling to room temperature the mixture gelled. Addition of heptane followed by distillation and addition of diethyl ether followed by distillation would not give a solid product. Eventually on prolonged heating at 75°–100° C. for about 2 hours, the residual slurry suddenly expanded and filled the flask and still head with an orange brown solid. This material was removed and dried at 100° C. The dried solid contained 54.3 percent boron and 11.6 percent sodium. The compound $NaB_{10}H_{13} \cdot C_4H_8O$ contains 50.0 percent boron and 10.6 percent sodium.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing sodium decaborane adduct, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided sodium decaborane adduct can be admixed with a high solids content solution of a partially condensed urea-formaldehyde or phenol-formaldehyde resin, the proportions being such that the amount of the resin is about 5 to 10 percent by weight, based upon the weight of the oxidizer and sodium decaborane adduct. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al., and U.S. Patent No. 2,646,596 to Thomas et al.

I claim:
A method for the preparation of a solid sodium decaborane tetrahydrofuran adduct which comprises reacting sodium metal and decaborane at a temperature of from 40° to 100° C. while the decaborane is dissolved in tetrahydrofuran, and thereafter recovering the solid adduct from the reaction mixture.

References Cited by the Examiner
UNITED STATES PATENTS
3,050,361   8/1962   Mutterties _____ 23—14

OTHER REFERENCES

"Abstract of Papers, 133rd Meeting, American Chemical Society," bears stamped receipt date of Mar. 31, 1958, pages 28L, 29L.

Lipscomb, "Boron Hydrides," 1963, page 162.

Toeniskoetter, "Some Reactions of Decaborane With Electrons and Electron Pair Donors," a thesis presented to the faculty of the St. Louis University in partial fulfillment of the requirements for the degree of doctor of philosophy, 1958, pages 56–58, 136.

OSCAR R. VERTIZ, Primary Examiner.

LEON D. ROSDOL, CARL D. QUARFORTH, MAURICE A. BRINDISI, Examiners.

L. A. SEBASTIAN, M. WEISSMAN,
Assistant Examiners.